Patented Aug. 14, 1945

2,382,742

UNITED STATES PATENT OFFICE 2,382,742

PROTECTIVE COATINGS

Harold K. Patch, Hermosa Beach, Calif., assignor to Crossfield Products Corp., Los Angeles, Calif., a corporation of California No Drawing. Application February 26, 1942, Serial No. 432,451

6 Claims. (Cl. 260—742)

This invention relates to protective coatings. More particularly it relates to coatings for decks of ships, floors and the like.

Some of the objects of the invention are to provide a coating of the kind in which an aqueous dispersion of natural or synthetic rubber is set by adequate dehydration but which coating is mixed with an aggregate of such nature that the completed coating is comparatively non-absorptive, light in weight, durable, wear-resistant, and non-slippery.

Other objects and advantages of my invention will appear to those skilled in the art upon reading the following description of the invention and of the manner of making, constructing, compounding, and using it, and I shall also set forth what I now consider the best manner of carrying my invention into practice.

In carrying out my invention, I provide a mixture containing: (1) an aqueous dispersion of natural or synthetic rubber, such as normal or concentrated rubber latex, preferably the latter; (2) a dehydrating agent, such as, preferably, aluminous cement; and (3) an aggregate or filler which I shall now describe.

I have conceived and discovered that surprisingly advantageous results are obtained by using particles of ground hard nut shells as the aggregate. The nut shells employed should be hard, indeed of the order of hardness of the shells of English walnuts. Certain other nuts, particularly some of the tropical nuts, have the desired hardness, etc., and may be employed. In the expression "nut shells having a hardness comparable to that of English walnut shells" I do not mean to exclude walnut shells since I prefer at present to use the latter; i. e., English walnut shells. The aggregate is prepared by grinding the nut shells and using such particles thereof as are preferably of a screen size of about from 8 to 20 mesh.

As specific examples of ingredients and proportions thereof, the following will be found to be satisfactory.

*Example I*

| | Parts by weight |
|---|---|
| (1) Normal rubber latex | 1 |
| (2) Aluminous cement | 1 to 1½ |
| (3) Ground English walnut shells having a particle size of between 8 to 20 screen mesh | 1¼ to 1¾ |

*Example II*

| | Parts by weight |
|---|---|
| (1) Concentrated rubber latex | ½ to 1 |
| (2) Aluminous cement | ½ to 1 |
| (3) Ground English walnut shells having a particle size of between 8 to 20 screen mesh | 1 to 1½ |

The three ingredients, dispersion, dehydrating agent, and aggregate, are thoroughly mixed and then applied, as by troweling, to the surface to be protected, and allowed to set.

The novel composition is admirably adapted to be applied to the steel decks of ships. It adheres readily to grease free and scale free steel decks without using cleats or other mechanical securing means. The coating, after setting, is non-absorptive, water-proof, durable, wear-resistant, and non-slippery. It is also light in weight by virtue of the comparatively light weight of the filler. The thickness of the coating will depend upon the conditions of use, the kind of wear to which it is to be subjected, etc. The coating does not crack upon expansion and contraction of the underlying steel deck.

I have discovered that the aggregate which I have disclosed, when embodied in the combination which I have described, is low in oxidation, both exceedingly light in weight and hard, and is readily gradable. The properties of lightness in weight coupled with hardness is an important one, particularly in connection with the decking of ships where light weight is desirable and where the conditions of use demand hardness for a practical decking. Such decks to be satisfactory must be resistant to abrasion and wear and I have found that by employing the aggregate which I have disclosed these desirable results are attained.

What I claim is:

1. A protective coating comprising a mixture containing rubber latex, an aggregate consisting of particles of English walnut shells of a screen size of about from 8 to 20 mesh, and aluminous cement in sufficient quantity to cause the mixture to set, the said aggregate being of sufficient quantity that the completed coating is non-absorptive, light in weight, durable, wear-resistant, and non-slippery.

2. A protective coating comprising a mixture containing normal rubber latex, an aggregate consisting of particles of English walnut shells of a screen size of about from 8 to 20 mesh, and aluminous cement in sufficient quantity to cause the mixture to set, the said aggregate being of sufficient quantity that the completed coating is non-absorptive, light in weight, durable, wear-resistant, and non-slippery.

3. A protective coating comprising a mixture containing concentrated rubber latex, an aggregate consisting of particles of English walnut shells of a screen size of about from 8 to 20 mesh, and aluminous cement in sufficient quantity to cause the mixture to set, the said aggregate being of sufficient quantity that the completed coating is non-absorptive, light in weight, durable, wear-resistant, and non-slippery.

4. A non-absorptive, light, durable, non-slippery deck covering produced by mixing about one-half to one part by weight of concentrated rubber latex, about one to one and one-half parts by weight of particles of English walnut shells having a screen size of about from 8 to 20 mesh, and about one-half to one part by weight of aluminous cement.

5. A non-absorptive, light, durable, non-slippery deck covering produced by mixing about one part by weight of normal rubber latex, about one and one-quarter to one and three-quarters parts by weight of particles of English walnut shells having a screen size of about from 8 to 20 mesh, and about one to one and one-half parts by weight of aluminous cement.

6. A non-absorptive, light, durable, non-slippery, adherent deck covering produced by mixing an aqueous dispersion of rubber, an aggregate consisting of particles of English walnut shells having a screen size of about from 8 to 20 mesh, and aluminous cement in sufficient quantity to cause the mixture to set, the said aggregate being of sufficient quantity that the completed deck covering is non-absorptive, light in weight, durable, wear-resistant, and non-slippery.

HAROLD K. PATCH.